(12) United States Patent
Francisco

(10) Patent No.: US 10,543,989 B2
(45) Date of Patent: Jan. 28, 2020

(54) BELT CONVEYOR WITH AUTOMATED IN-LINE TENSION CONTROL SYSTEM

(71) Applicant: KSi Conveyor, Inc., Sabetha, KS (US)

(72) Inventor: Cesar F. Francisco, Cissna Park, IL (US)

(73) Assignee: KSi Conveyor, Inc., Sabetha, KS (US)

(*) Notice: Subject to any disclaimer, the term of this patent is extended or adjusted under 35 U.S.C. 154(b) by 0 days.

(21) Appl. No.: 16/025,748

(22) Filed: Jul. 2, 2018

(65) Prior Publication Data

US 2019/0009989 A1    Jan. 10, 2019

Related U.S. Application Data

(60) Provisional application No. 62/529,021, filed on Jul. 6, 2017.

(51) Int. Cl.
*B65G 23/44* (2006.01)
*B65G 43/00* (2006.01)

(52) U.S. Cl.
CPC ............. *B65G 23/44* (2013.01); *B65G 43/00* (2013.01); *B65G 2201/042* (2013.01)

(58) Field of Classification Search
CPC ....................................................... B65G 23/44
USPC .......... 198/810.01, 810.03, 810.04, 813–816
See application file for complete search history.

(56) References Cited

U.S. PATENT DOCUMENTS

| | | | |
|---|---|---|---|
| 2,929,640 A | * | 3/1960 | Faiver ................ B60G 17/0155 267/64.16 |
| 4,372,440 A | | 2/1983 | Ringis |
| 4,723,647 A | * | 2/1988 | Norton ................. B65G 47/766 119/57.7 |
| 4,799,584 A | | 1/1989 | Hartsuiker et al. |
| 5,054,608 A | | 10/1991 | Bryant |
| 5,123,517 A | | 6/1992 | Windau |
| 5,174,435 A | | 12/1992 | Dorner et al. |

(Continued)

FOREIGN PATENT DOCUMENTS

| | | |
|---|---|---|
| CN | 201458312 U | 5/2010 |
| CN | 106672554 A | 5/2017 |

(Continued)

OTHER PUBLICATIONS

Martin Engineering, Automated Tensioner for Conveyor Belt Cleaners Reduces Wear and Maintenance, Martin News & Press, Mar. 20, 2017, Neponset, Illinois.

(Continued)

*Primary Examiner* — William R Harp
(74) *Attorney, Agent, or Firm* — Daniel J. Coughlin; Coughlin Law Office LLC

(57) ABSTRACT

A belt conveyor with automatic in-line tensioning. A tensioner bar is slidably received into a tensioning slot and guided by a plurality of rails. At least one air spring is positioned between the tensioner frame and the tensioner bar. The first air spring pushes the tensioner bar such that movement of the tensioner bar moves the end roller to affect a tensioning force upon the endless belt. An air pressure gauge can display an air pressure value corresponding to a tension force of the endless belt. A tracking assembly allows tracking of the endless roller independent of the tensioning. A controller can controls the tensioning and release of tensioning based on operational or environmental factors.

15 Claims, 13 Drawing Sheets

(56) References Cited

U.S. PATENT DOCUMENTS

| | | | |
|---|---|---|---|
| 5,203,447 A * | 4/1993 | Ewert | B65G 23/34 |
| | | | 198/807 |
| 5,458,051 A | 10/1995 | Alden et al. | |
| 5,489,056 A * | 2/1996 | Staschewski | B65G 23/44 |
| | | | 226/173 |
| 6,267,228 B1 | 7/2001 | Cadwell et al. | |
| 6,708,817 B2 | 3/2004 | Klabisch et al. | |
| 6,752,261 B1 | 6/2004 | Gaeddert et al. | |
| 6,971,509 B2 | 12/2005 | Ertel et al. | |
| 8,910,778 B1 | 12/2014 | Francisco et al. | |
| 9,388,693 B2 | 7/2016 | Whelan | |
| 9,554,515 B1 | 1/2017 | Hartman et al. | |
| 2007/0082772 A1 | 4/2007 | Aulanko et al. | |
| 2015/0217943 A1 | 8/2015 | Friestad et al. | |
| 2017/0215342 A1 | 8/2017 | Allochis | |

FOREIGN PATENT DOCUMENTS

| | | |
|---|---|---|
| CN | 106697781 A | 5/2017 |
| GB | 793229 A | 4/1958 |
| GB | 2042453 A | 9/1980 |
| JP | 5628794 B2 | 11/2014 |

OTHER PUBLICATIONS

Wohlbier, Reinhard H., Martin Engineering: Automated Tensioner for Conveyor Belt Cleaners Reduces Wear and Maintenance, Apr. 2, 2017, 6 pages.

Pellerin Milnor Corporation, Retrofit kit KYSSLBT001: Press Conveyor Belt Spring Tension Kit, Jan. 6, 2004, 7 pages, Kenner, Louisiana, USA.

Hosch, Michael A., Belt Tensioning Methods for Small Package Conveyors, Mar. 20, 2017, Dorner Mfg. Corp., 13 pages, Hartland, Wisconsin.

Kulinowski & Kasza, Belt Conveyor Theory, the publication date is unknown but the publication was known to the Applicant prior to the priority date of the application, Department of Mining, Dressing and Transporting Machines AGH, Poland.

キューン、マイケル, Machine-translation of JP5628794B2 "Belt Conveyor," Nov. 19, 2014, Japan.

任英广, CN201458312U—Machine Translated Text "Air spring tensioning device of sweeper", May 12, 2010, China.

兒新跃, Machine-translation of CN106672554A "Rain-proofing device for tail tensioning section of belt conveyor", May 17, 2017, China.

张敏, CN106697781—Machine Translated Text "Using method of conveyor belt capable of achieving tensioning adjustment", May 24, 2017, China.

\* cited by examiner

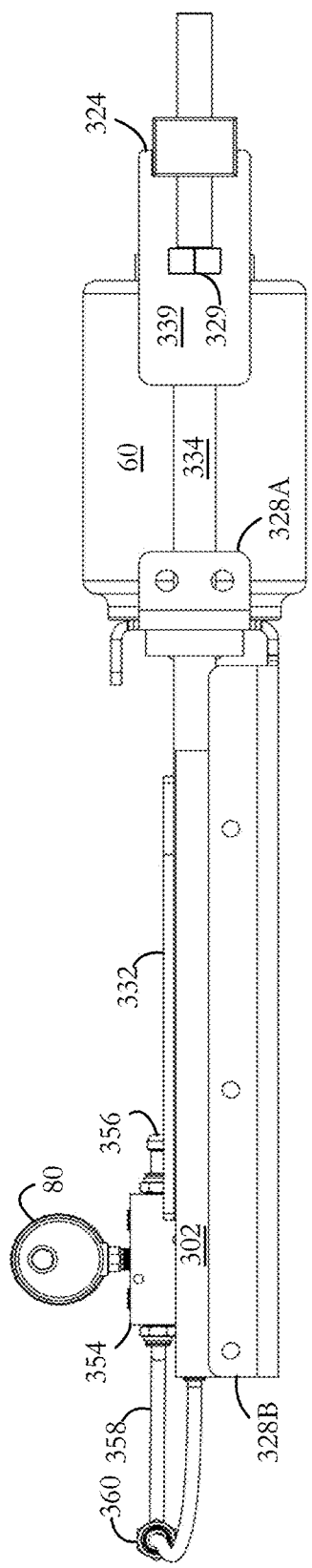
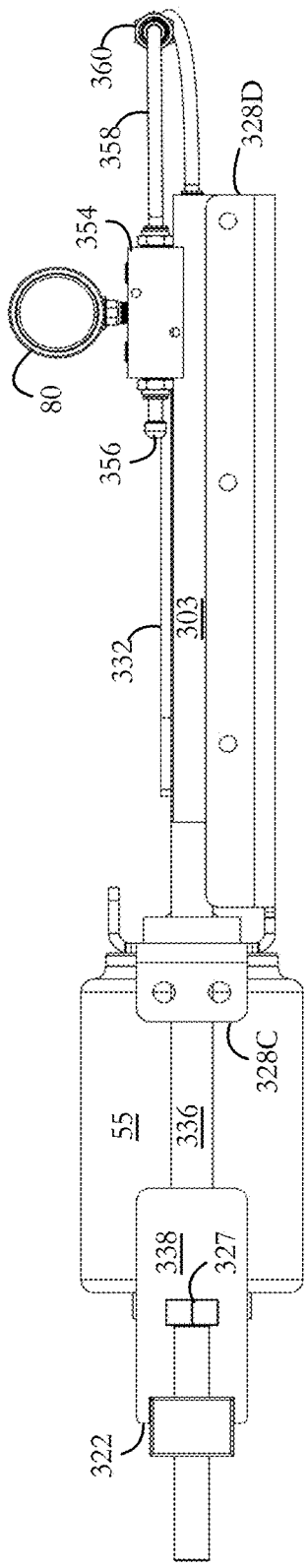

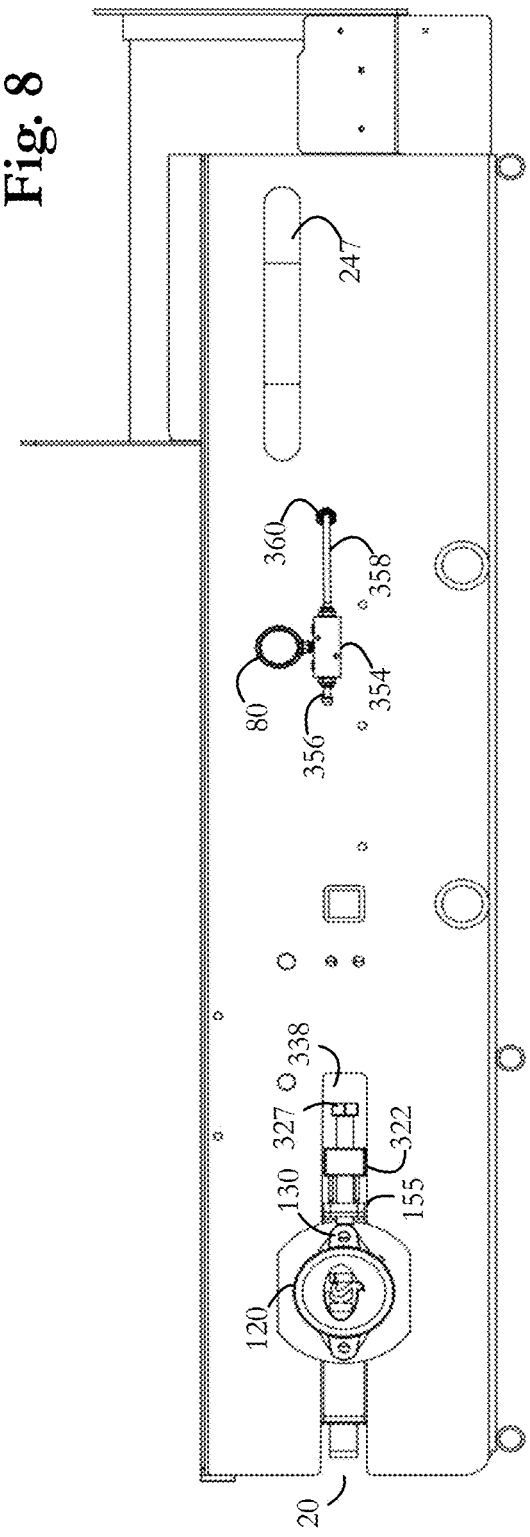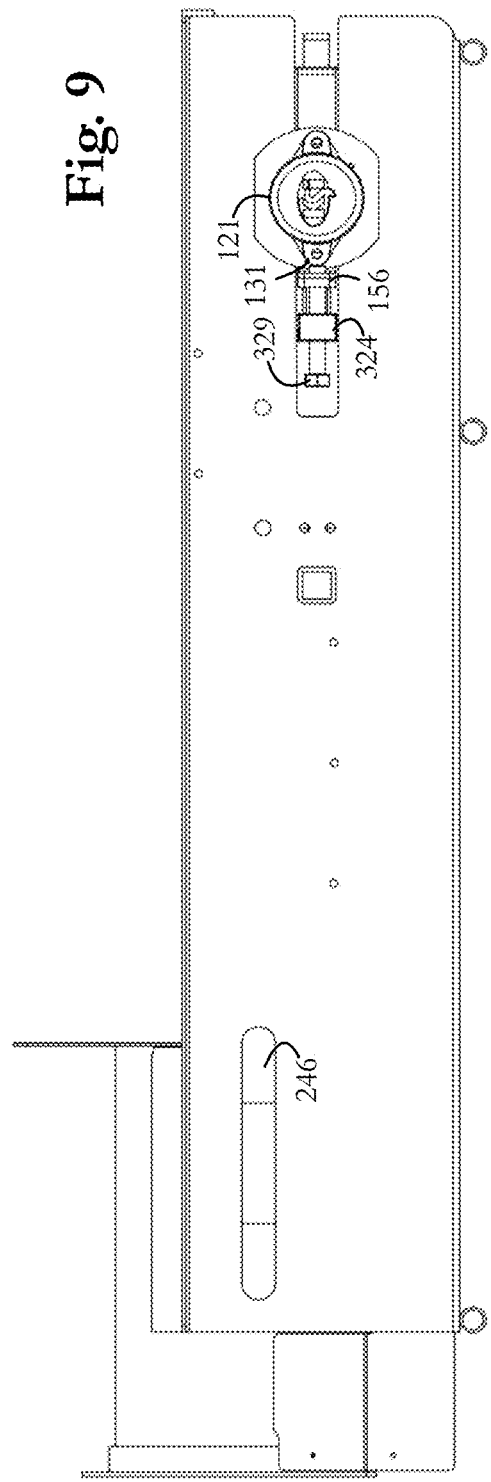

BELT CONVEYOR WITH AUTOMATED IN-LINE TENSION CONTROL SYSTEM

CROSS-REFERENCES

This application claims the benefit of U.S. Provisional Application No. 62/529,021 filed on 6 Jul. 2017.

GOVERNMENT RIGHTS

Not Applicable.

REFERENCE TO CDS

Not Applicable.

FIELD

The present invention relates to a device for tensioning the belt of an endless conveyor. More specifically, the present invention relates to an automated in-line tensioning mechanism for endless belt conveyors.

BACKGROUND

Belt conveyors are an effective solution for transporting particulate or granular material at an incline. Proper belt tension must be maintained to efficiently drive an endless conveyor belt. Tensioning refers to the proper stretching of the endless belt between the two end rollers. Jackscrew tensioning is the most common method of tensioning a conveyor belt. By turning a screw at the end of the conveyor, a bearing block moves outwardly which creates tension on the belt. Once tensioned, the belt must be tracked using a separate adjustment that is dependent on the tensioning.

When a belt is improperly tensioned, then the belt does not track well. This results in a decreased belt lifespan. Also, when a belt is improperly tensioned, the power transfer from the driven roller is compromised.

SUMMARY

We recognized that maintaining proper tensioning of a conveyor belt could be automated using an air spring mounted between a tensioning frame and a tensioning bar. The air spring is operably connected to an air manifold. The air spring is capable of exerting a sufficient tensioning force on the belt and end roller through the tensioning assembly.

The air spring maintains tension on the belt by exerting pressure on the roller through the tensioning bar. Tracking is accomplished using a jackscrew on either side of the tensioning bar. The jackscrews extend against a tracking subframe that allows the user to adjust the tracking of the belt. This is advantageous because the tracking settings are independent of the tensioning settings. Usually with jackscrew tensioning and tracking systems, adjusting the tensioning requires re-adjusting the tracking. By de-coupling the tracking from the tensioning, tension on the belt may be released and reapplied without affecting the tracking.

I recognized using air springs to generate the tensioning force allows a user to quickly and easily relieve the tension from the belt. While tension is necessary for the operation of the belt, prolonged exposure to tension can decrease belt life. Agricultural conveyors and conveyors at seed treatment sites may be operated for three months of the year. By relieving the tension pressure, the belt life may be increased.

Another advantage is that applying constant tension to the belt stretches the belt over time. The longer belt then needs to be re-tensioned, otherwise the conveyor belt performance will decrease. I recognized that relieving belt tensioning using an air spring—without requiring re-tracking—will reduce belt stretching due to prolonged tensioning.

I also recognized that using air pressure is advantageous over spring tensioning systems, as the air spring provides an easy read out on pressure. A pressure gauge can display an air pressure value corresponding to the current system pressure, indicating whether the appropriate tension is applied to the belt. Furthermore, some conveyors—such as overbin conveyors and bin unload conveyors—have the tensioning mechanisms in locations that are difficult to assess. The pressure gauge can be located in a more convenient location, such as ground level or outside of the bin. In this way, the user can verify the proper tension without climbing 40-feet to check an overbin conveyor.

I also recognized that it is possible to mount the air inlet or air control in a convenient location, to allow the user to activate proper tensioning on an inconveniently located conveyor. This allows the user to not only verify proper tension, but also to increase belt tension if the gauge indicates an improper air pressure.

I recognized that the tensioner bar can be maintained perpendicular to the longitudinal axis of the tail assembly be mounting a pair of rails perpendicular to the tension bar. Those rails are received by respective linear bearings that maintain the rails parallel with the longitudinal axis of the tail assembly. One advantage to this configuration is the tracking is adjusted independent from the tensioning.

I also recognized that using an air spring to generate the belt tension allows the system to be automated. This may be especially beneficial for use in seed treatment systems, which utilize numerous conveyors during a region's planting season. Once planting season is over, then the conveyors often sit idle. These seed treatment systems commonly use automation to turn conveyors on and off, activate slide gates, weigh the seed, and apply treatment. The control system which contains the automation programming can include processes for de-tensioning the conveyor belt at the end of a treatment season or even at the end of the day. During system start up, or on the activation of a seed treatment cycle, the system can activate the air springs to apply tension to the conveyor belts prior to turning on the conveyor belt motors.

BRIEF DESCRIPTION OF DRAWINGS

Aspects are illustrated by way of example, and not by way of limitation, in the accompanying drawings, wherein:

FIG. 6 shows a side view of the tensioner frame, air springs, and tensioner bar of the embodiment of FIG. 1.

FIG. 7 shows an opposite side view of the tensioner frame, air springs, and tensioner bar of the embodiment shown in FIG. 6.

FIG. 8 shows a side view of the lower tail assembly of a conveyor showing an embodiment of the automated in-line tension control system shown in FIG. 1.

FIG. 9 shows an opposite side view of the lower tail assembly of FIG. 8.

DETAILED DESCRIPTION

Figure 1:
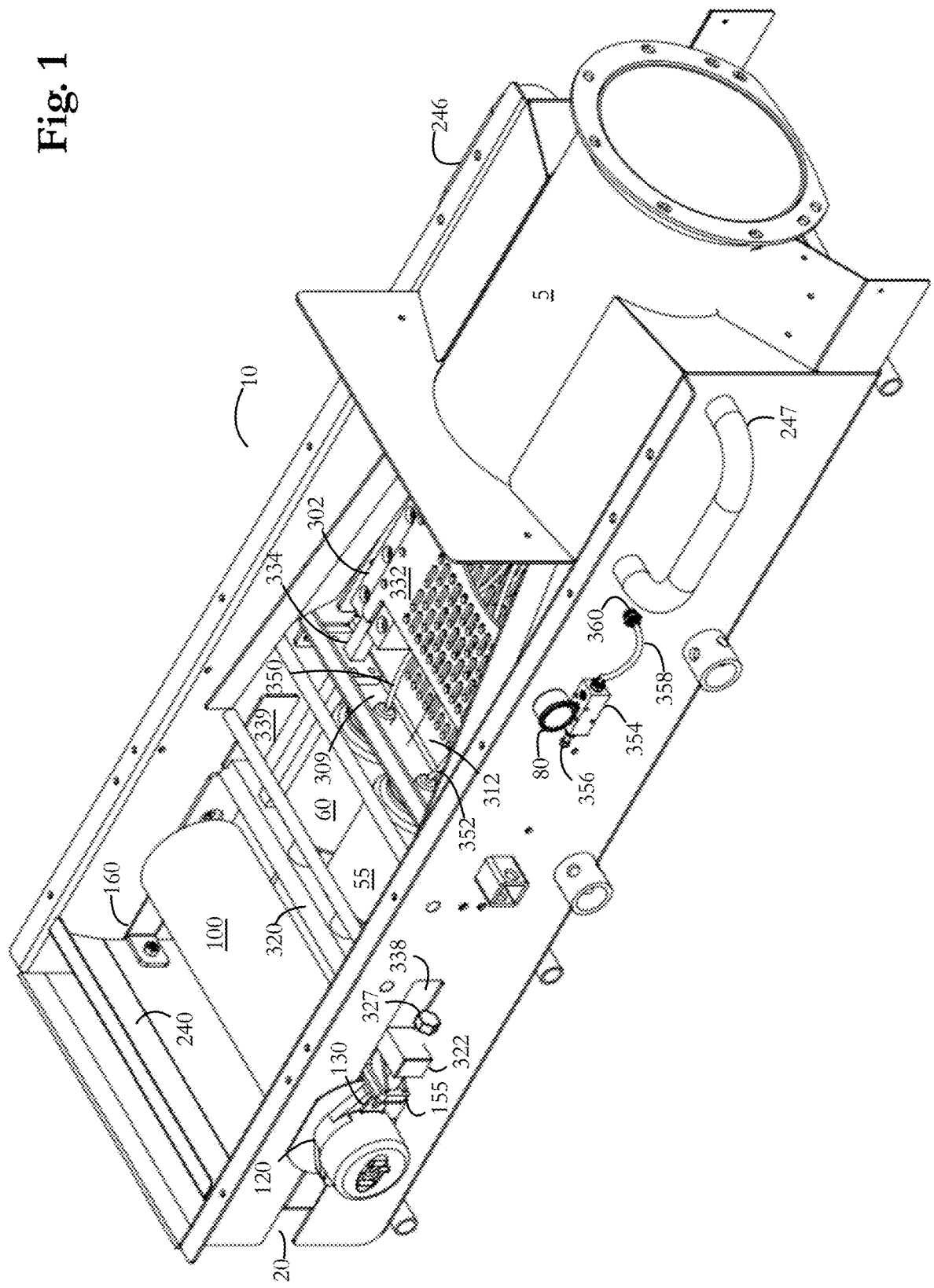
FIG. 1 shows a top side perspective of a lower tail assembly of a conveyor showing an embodiment of the automated in-line tension control system.

Referring now to the invention in more detail, in FIG. 1 there is shown a lower tail assembly 10 of a conveyor 5. The conveyor 5 has a frame 15 providing structural support for the conveyor. The frame 15 has a tensioning slot 20 disposed in a lateral side 25 of the lower tail assembly 10. A first end roller 100 is slidably received by the tensioning slot 20 of the conveyor frame 15. A pair of handles 246, 247 allow the user to maneuver the conveyor.

Figure 10:
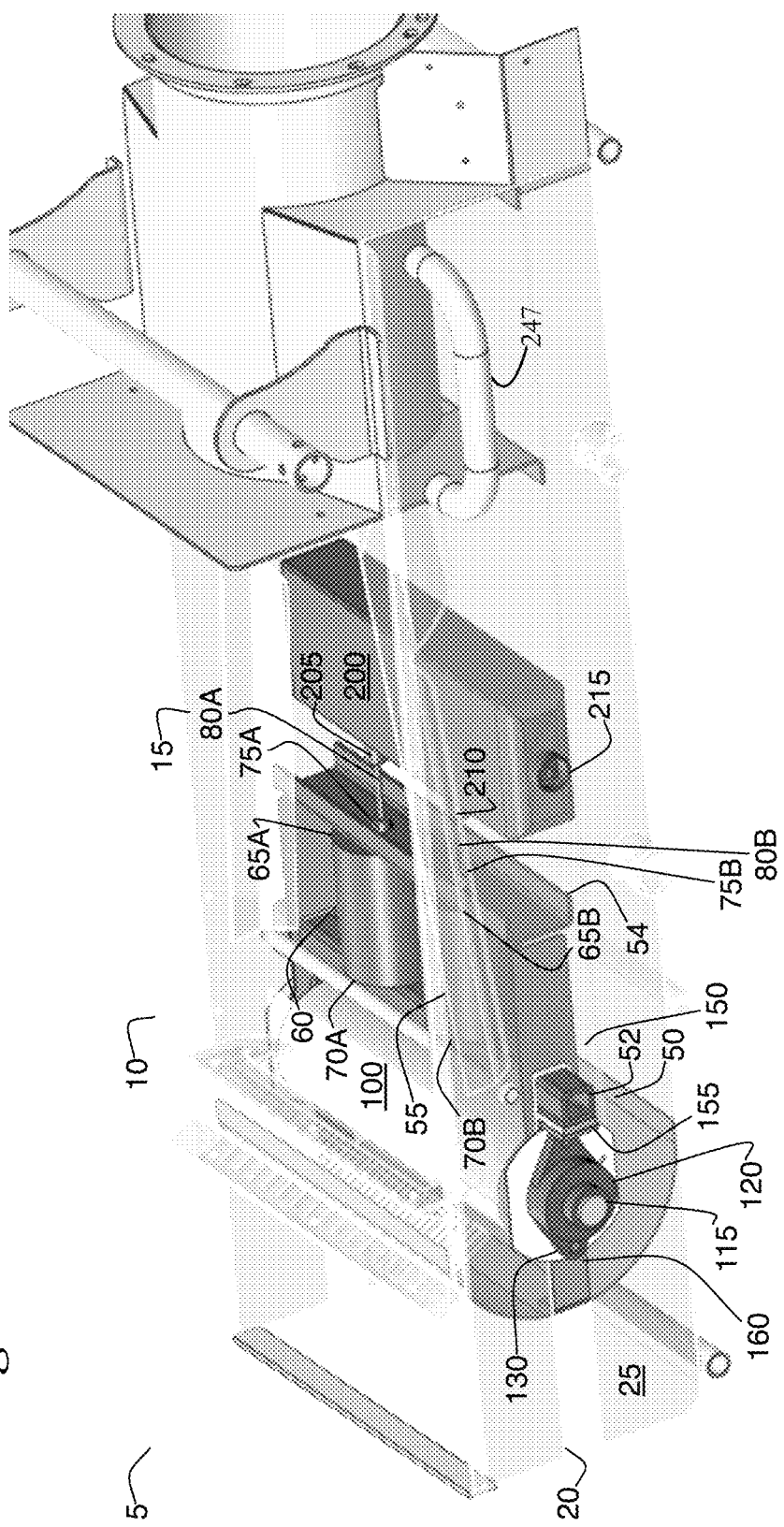
FIG. 10 shows a top side perspective view of the lower tail assembly of a conveyor showing another embodiment of the automated in-line tension control system.

As shown in FIG. 10, a tensioning bracket assembly 50 is received into the tensioning slot 20. The tensioning bracket assembly 50 has a base member 52. The base member 52 is connected to the first end roller 100 through the tracking subframe 150, the tracking subframe is described below. The first end roller 100 configured to be received by the endless belt. The endless belt, not shown in the drawings, is looped over the first end roller 100 at the lower tail assembly 10. A second end roller (not shown) is disposed at the upper head assembly portion of the conveyor. The belt is operated between the first end roller 100 and the second end roller.

The first end roller 100 is used to tension and track the endless belt. The first end roller 100 has an axle, a first axle end, and a second axle end. Each of the first axle end 110 and the second axle end are received by a respective ball bearing mount, such as the first ball bearing mount 120 and second ball bearing mount 121. The first ball bearing mount 120 allows the axle 105 to freely rotate. The first bearing flange 130 and second bearing flange 131 create an extension from the first ball bearing mount 120 and second ball bearing mount 120, which allows the roller to be securely mounted to the tensioning bracket assembly 50.

In order to properly tension the first end roller 100, the tensioning bracket assembly 50 utilizes pressure generated by a first air spring 55 and a second air spring 60. Each of the air springs 55, 60 have a first supply end 65A, B mounted to the frame 15 of the conveyor. The first supply end 65A, 65B configured to receive pressurized air from a pressurized air source, such as a pressurized airline, an air compressor, or a pressurized tank. The pressurized air source can be integrated with the conveyor 5 or be a separate component. Each of the air springs 55, 60 also has a first bottom end 70A, 70B in contact with the base member 52.

As the pressure of the pressurized air fills both air springs 55, 60, the air springs 55, 60 expand exerts an outward force upon the first end roller 100 through the tensioning bracket assembly 50. In order to exert an equal pressure through each of the first air spring 55 and the second air spring 60, the respective first supply ends 65A, B are operably connected to an air manifold 200. The air manifold 200 has a first outlet port 205, a second outlet port 210, and an inlet port 215. In one embodiment, the air manifold 200 is connected to the external pressurized air source through inlet port 215. In order to facilitate the pressurized air connection with an external pressurized air source, the inlet port 215 extends through the frame 15 of the lower tail assembly 10 of the conveyor 5. In another embodiment, the air manifold comprises the pressurize air source, such as a compressor or tank. Each outlet ports 205, 210 of the air manifold 200 is connected to the respective supply port 75A, 75B through a proper connection, such as airline 80A, B as shown in FIG. 1. Respective valves (inlet valves and outlet valves) may be coupled with each of the ports (inlet ports and outlet ports) to enable automated control of the flow of pressurized air through the ports. For example, an inlet valve would be configured to receive a tensioning signal. Upon receiving the tensioning signal, the inlet valve would open causing pressurized air to flow through the inlet port, extending the air springs, and applying a tensioning force upon the endless belt in an axis perpendicular to the longitudinal axis of the end roller. Additionally, an outlet valve can be configured to receive a release signal. Upon receiving the release signal, the outlet valve would open causing pressurized air to release through the outlet port, contracting the air springs, and releasing the tensioning force upon the endless belt in an axis perpendicular to the longitudinal axis of the end roller. In this way, a controller could automate the tensioning and release of belt tension.

The air springs apply proper and even tensioning at the first axle end 110 and the second axle end 115 of the first end roller 100. The first air spring 55 and a second air spring 60 are configured to extend parallel to each other between the conveyor frame 15 and the tensioning bracket assembly 50. In this parallel configuration of the air springs 55, 60, the tensioning force is exerted through the first end roller 100 and upon the endless belt.

In their parallel configuration, both of the air springs 55, 60 extend under the pressurized air to apply the tensioning force. In one embodiment, the air springs are sleeve-type air bags. In one embodiment of the sleeve-type air bags, the air springs are capable of displacing approximately 800 lbs. of force at 100 psi of air pressure.

In addition to providing proper tensioning, the belt must be properly tracked. Tracking relates to the lateral, side-to-side movement of the belt that is affected by adjusting the tensioning on the first axle end 110 of the first end roller 100 relative to the second axle end 115. In order to control tracking, a tracking assembly 150 is disposed between the tensioning bracket assembly 50 and the first end roller 100. The tracking assembly 150 has a first tracking flange 155 and second tracking flange 156 that protrude through the respective sidewall of the conveyor 5. The tracking assembly 50 can include the first ball bearing mount 120 configured to receive the first axle end 110. And the tracking assembly 50 can include the second ball bearing mount 125 configured to receive the second axle end 115.

As shown in FIG. 1, the tracking adjustment assembly 150 is configured to selective adjust the spacing between the base member 52 and the tracking assembly 150. In order to adjust the tracking assembly 150, a spacing adjustment mechanism controls the longitudinal distance between the tracking assembly 150 and the tensioning bracket assembly 50. The spacing adjustment mechanism can be a threaded bolt that is received into a threaded aperture in a lateral base end portion of the base member 52 and the tracking flange 155 of the tracking assembly. Alternatively, the spacing adjustment mechanism can be a linear actuator, a spring, or other mechanical spacing element. The threaded bolt allows for selective adjustment of the spacing between the protruding portion of the base member 52 and the tracking flange 155. The tracking flange 155 is connected to the first end roller 100 with a longitudinal extension bracket 160. The longitudinal extension bracket 160 extends longitudinally from the tracking flange 155. The first ball bearing mount 120 is mounted to the longitudinal extension bracket. Adjusting the spacing refers to moving at least one end of the tracking adjustment assembly 150 in the longitudinal axis of the conveyor 5. Adjusting the spacing between the a lateral side of the base member 52 and the tracking flange 155 the angle of the roller relative to the conveyor frame for proper belt tracking. In one embodiment, threaded apertures are made in each lateral side of the base member 52 and in the tracking flanges 155 of both lateral sides, allowing for threaded bolts to be received and adjust both lateral sides of the first end roller 100.

As shown in FIG. 1, the belt tension of the conveyor 5 can be measured by checking air pressure from the air springs 55, 60 or from the air manifold 200. An air pressure gauge 80 can be installed to conveyor 5 to show belt tension range. Standard analog or digital air pressure gauges can be incorporated to provide a read out of belt tension. The air pressure gauge could be configured to indicate the proper pressure ranges for proper conveyor operation. Each of the air springs 55, 60 is operably connected to an air supply manifold 354. The pressure gauge 80 can be directly connected to the air supply manifold 354. The air supply manifold can be mounted internal or external of the conveyor frame 15. The air supply manifold has a primary air inlet 356 for connecting the air supply manifold to a pressurized air supply (not shown). Air supply lines 350, 352, 358, are provided to connect the air supply manifold 354 to the air springs 55, 60. A frame pass through port 360 is provided to connect appropriate air supply lines through the conveyor frame 15.

Figure 11:
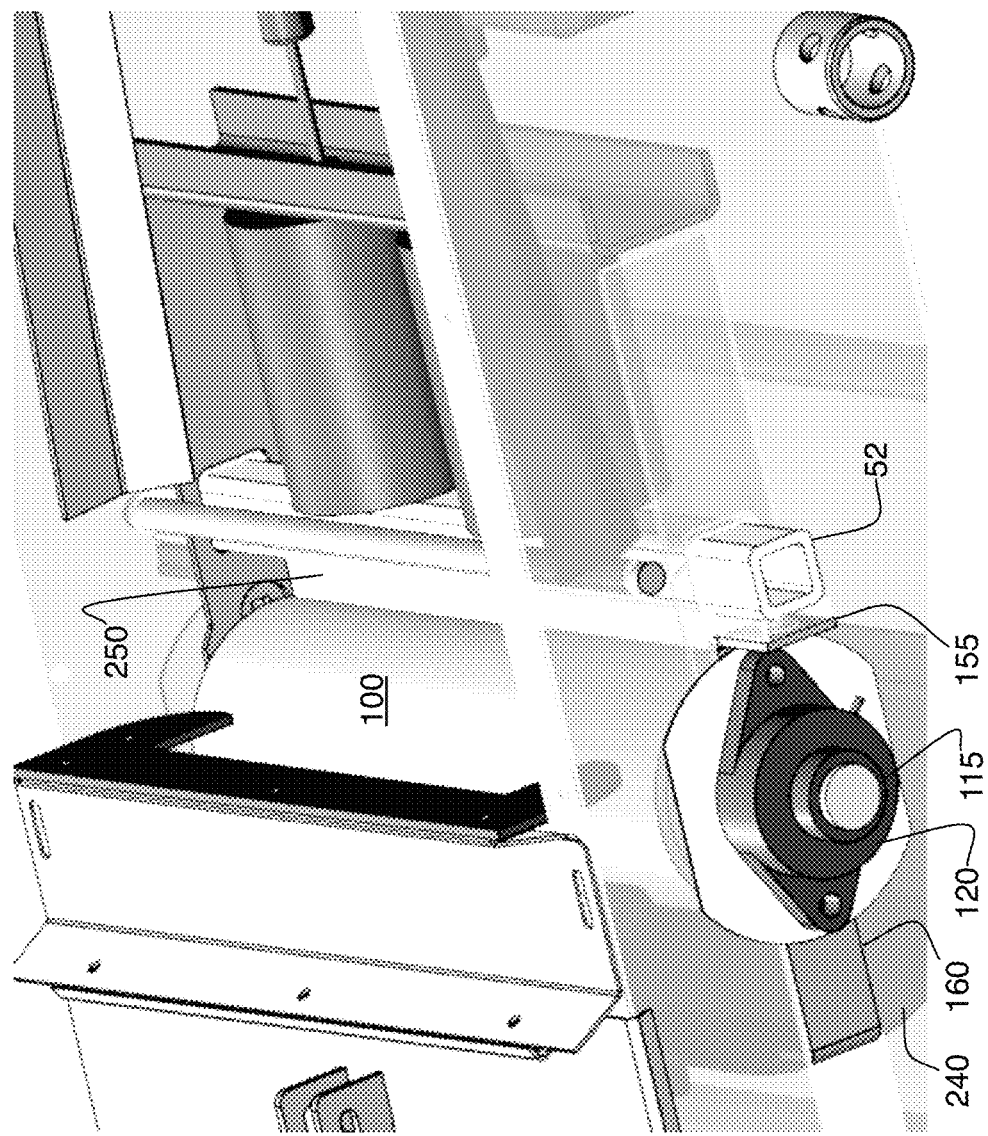
FIG. 11 is a top-side perspective view of the lower tail assembly of the embodiment shown in FIG. 10.

FIG. 11 shows an optional roller scraper 250 for cleaning the first end roller 100. The roller scraper 250 is shown mounted to the base member 52. In this configuration, the roller scraper 250 maintains contact with the end roller over the full extension range of the air springs 55, 60. In an alternative embodiment, the roller scraper 250 is mounted to the tracking assembly 150. The roller scraper 250 improves contact between the first end roller 100 and the belt by removing product, dust, and debris that would otherwise accumulate between the first end roller 100 and the inner belt surface. In one embodiment, the roller scraper 250 is made out of a low-friction plastic material, such as ultra-high molecular weight (UHMW) polyethylene.

Figure 3:
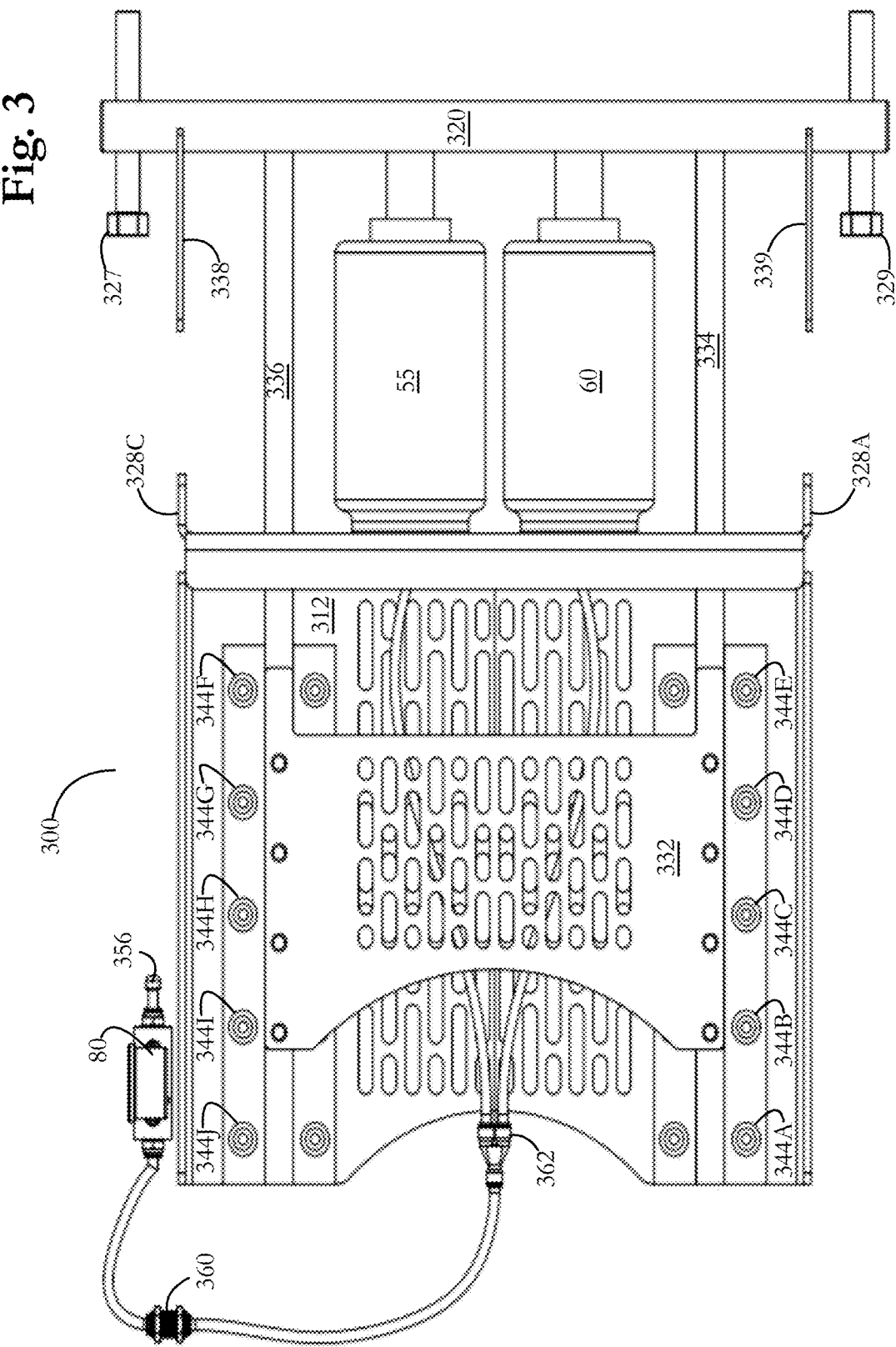
FIG. 3 shows a top view of the tensioner frame, air springs, and tensioner bar of the embodiment of FIG. 1.
Figure 4:
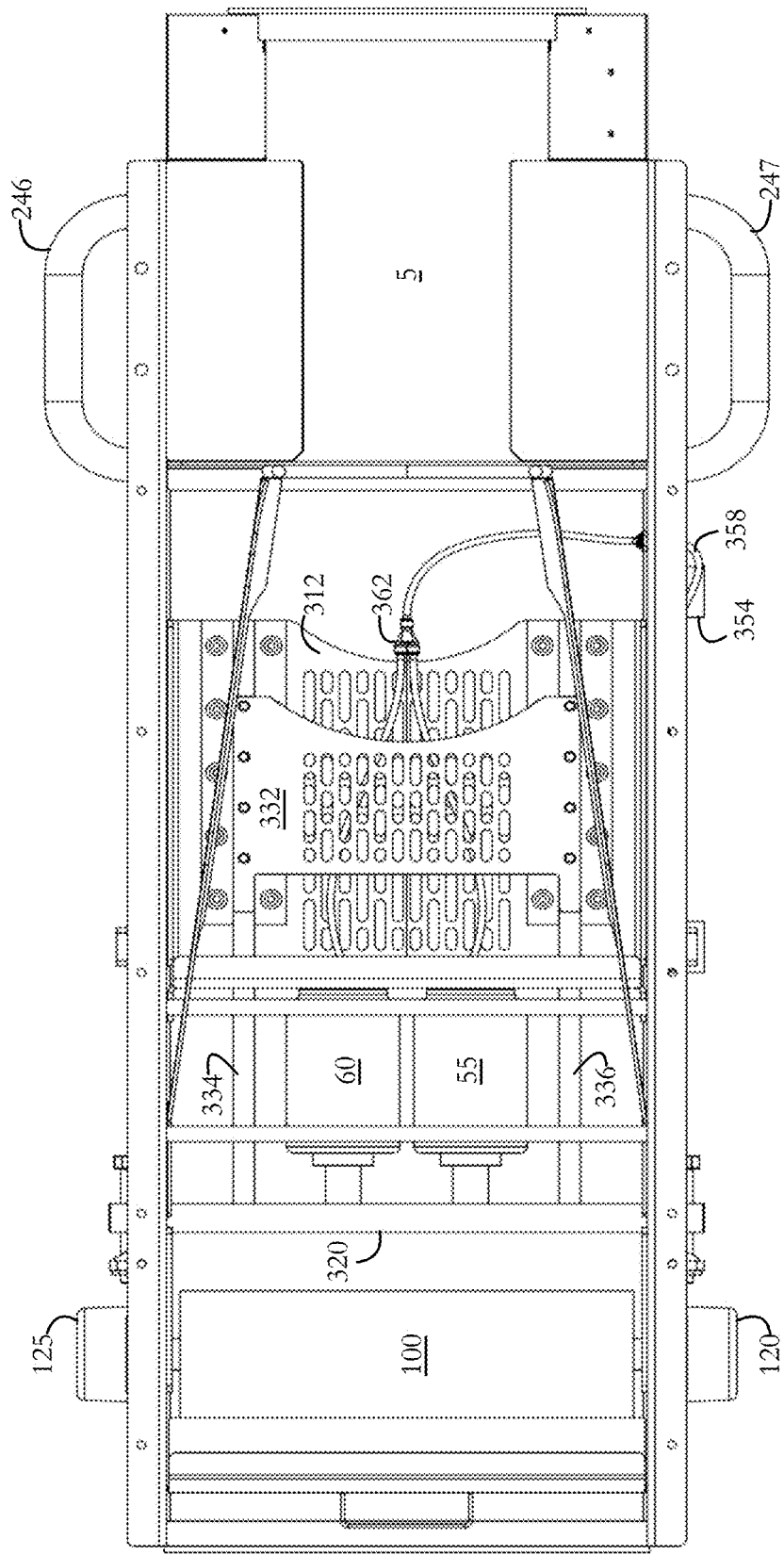
FIG. 4 shows a top view of the lower tail assembly of a conveyor showing an embodiment of the automated in-line tension control system of FIG. 1.
Figure 5:
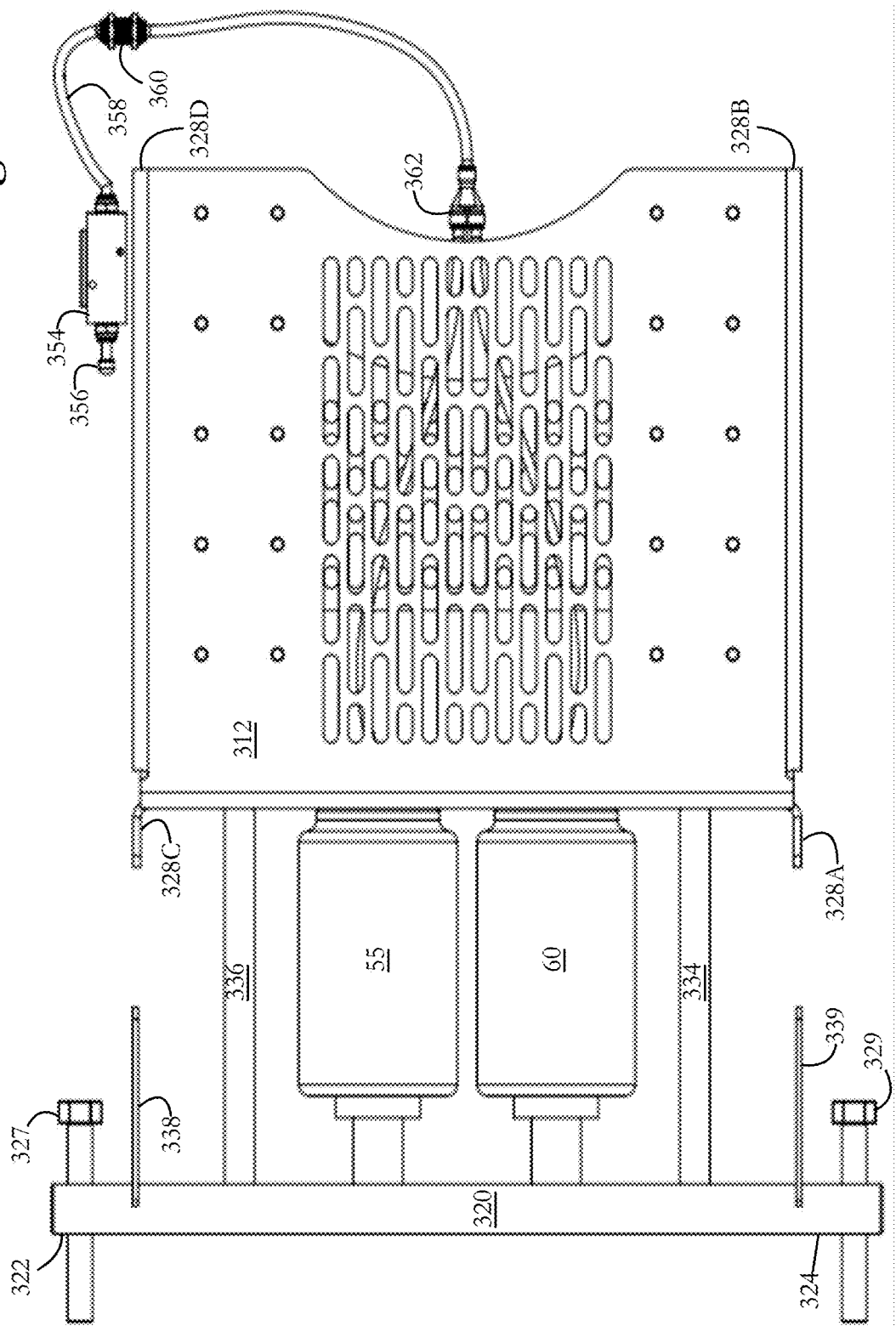
FIG. 5 shows a bottom view of the tensioner frame, air springs, and tensioner bar of the embodiment of FIG. 1.

In another embodiment, as shown in FIG. 4, the tensioner bar 320 (which is analogous to base member 52) is maintained in an orientation perpendicular to the longitudinal axis of the lower tail assembly by cooperating with a tensioner frame 300. The tensioner frame 300 is comprised of a lower plate 312. The lower plate 312 provides structure to attach a first linear bearing 302 and a second linear bearing 303. Each plate extends in a generally horizontal plane, as illustrated in FIG. 3. The lower plate 312 may comprise a mesh horizontal surface having a plurality of vertical openings to allow dust and debris to fall through the openings, as shown in FIG. 5. The tensioner frame 300 also comprises a frame bar 309. The frame bar 309 provides structure to support the first air spring 55 and the second air spring 60 in order to resist movement of the air springs toward the head end of the conveyor. Appropriate tensioner flanges 328A, 328B, 328C, 328D for attaching the tensioner frame 300 to the conveyor frame 15 are provided from both the lower plate 312 and the frame bar 309. The frame bar 309 is provided with a first rail slot 310 and a second rail slot 311 through which the first rail 334 and second rail 336 may pass. A splitter 362 may be provided in addition to or instead of a manifold block to provide sufficient airlines directed to each air spring, as shown in FIG. 3.

The linear bearings 302, 303 guide the movement of a pair of rails 334, 336 in an axis parallel with the longitudinal axis of the lower tail assembly 10. The first linear bearing 302 and second linear bearing may be made from any material sufficient to guide the rails 334, 336, however it is contemplated that the linear bearings be made from ultra high molecular weight (UHMW) polyethylene. UHMW provides low friction, self-lubricating and high slip properties, which are advantageous for sliding the rails upon. Each linear bearing has a guide slot—a first guide slot 304 and a second guide slot 305—within which the rails 334, 336 are received. In order to provide the linear bearings 302, 303 with sufficient rigidity to maintain the rails parallel with each other and with the longitudinal axis of the lower tail assembly, a plurality of bushings 344A, 344B, 344C, 344D, 344E, 344F, 344G, 344H, 344I, 344J are vertically inserted within each side longitudinal side of the linear bearing.

Figure 2:
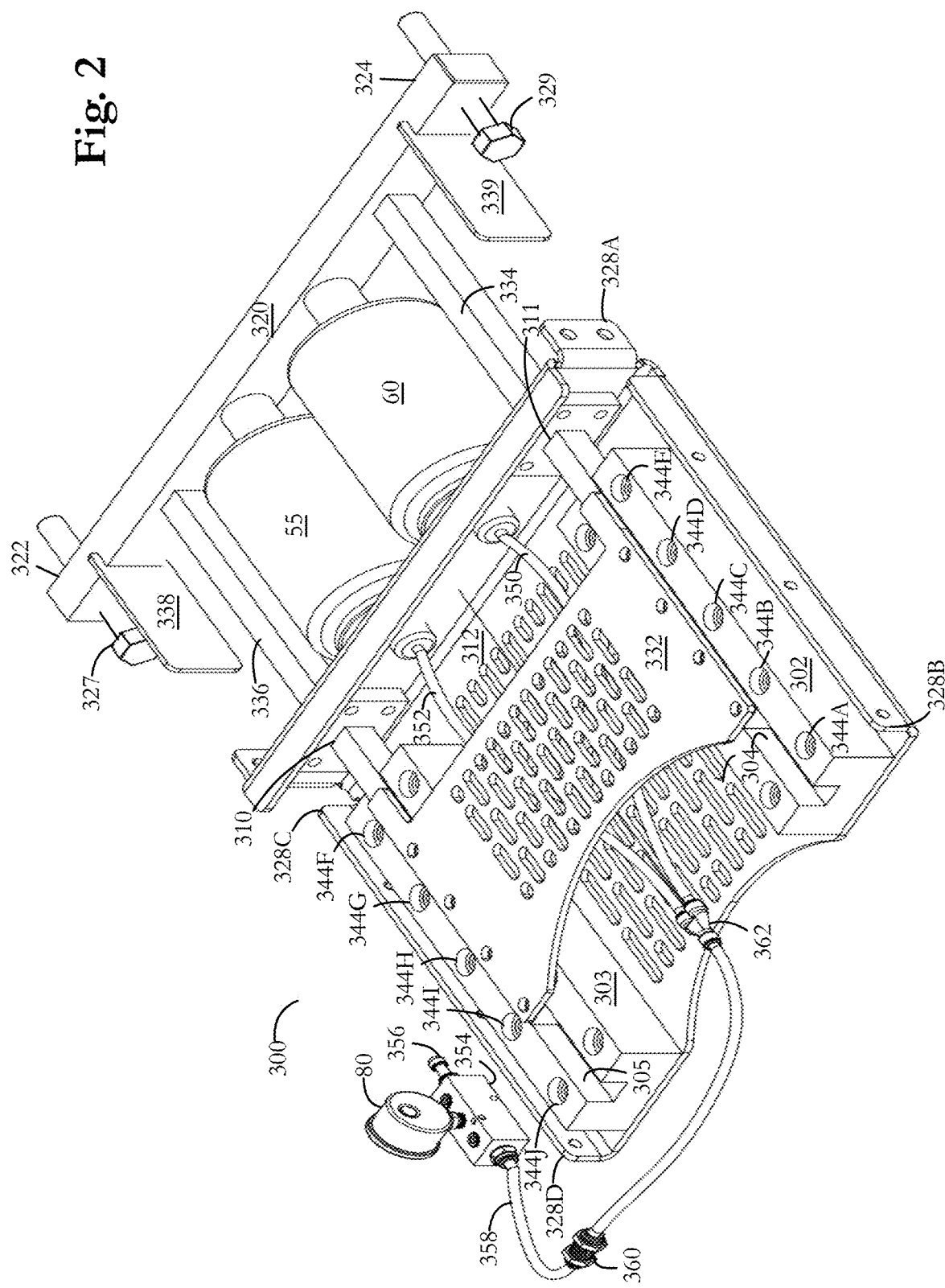
FIG. 2 shows a top side perspective view of the tensioner frame, air springs, and tensioner bar of the embodiment of FIG. 1.

To assist in maintaining the rails 334, 336 oriented parallel with the longitudinal axis of the lower tail assembly 10, an upper plate 332 is mounted to the head end of the rails 334, 336. Each of the rails 334, 336 has a head end located toward the head end of the conveyor and a tail end of the rail that is located toward the tail assembly. The upper plate 332 is mounted to both rails 334, 336 to provide structural stability to prevent one rail from moving further than the other rail. The upper plate 332 may comprise a mesh horizontal surface having a plurality of vertical openings to allow dust and debris to fall through the openings, as shown in FIG. 2.

The tail end of the rails 334, 336 are mounted to the tensioner bar 320, as shown in FIG. 4 the rails are mounted perpendicular to the longitudinal axis of the tensioner bar. The tensioner bar 320 extends across the frame 15 parallel to the longitudinal axis of the lower tail assembly 10 (if the longitudinal axis of the lower tail assembly 10 is the Y-axis, then the tensioner bar 320 extends along the X-axis, with the Z-axis being vertical). The tensioner bar 320 extends beyond the frame 15 on both lateral sides in the X-axis, providing a right peripheral tensioner bar portion 322 and a left peripheral tensioner bar portion 324. Tracking linear actuators 327, 329 are disposed within the right tensioner bar portion 322 and a left tensioner bar portion 324, as shown in FIGS. 6 and 7. Since the tensioner bar 320 is maintained parallel to the longitudinal axis of the end roller, the proper tracking of the roller can be accomplished independent of the tensioning. Another advantage is that the tracking settings—the length of extension of the tracking linear actuators 327, 329—is maintained when the tension is removed by releasing the air pressure from the air springs 55, 60. The tracking linear actuators 327, 329 are accessible from the exterior of the conveyor frame, as shown in FIGS. 8 and 9.

FIG. 10 shows the first slot cover 338 and the second slot cover 339. The first slot cover and second slot cover prevent material from entering through the tensioning slot 20. FIG. 10 also shows an embodiment of the automatic in-line tensioning system without a rail.

Figure 12:
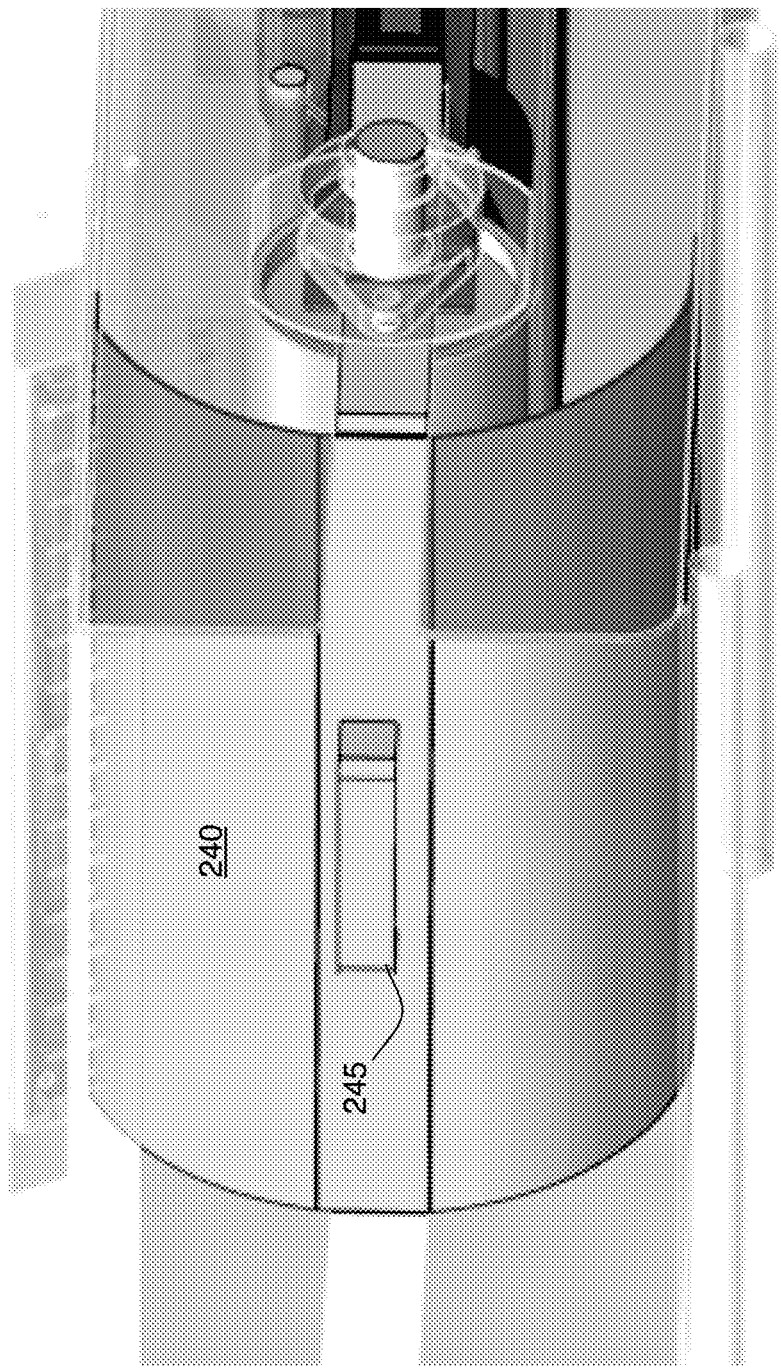
FIG. 12 is a side perspective view of the lower tail assembly of a conveyor showing the embodiment of FIG. 10, this view highlighting the curved back door cleanout.

FIG. 12 shows cleanout door of the lower tail assembly 10. The cleanout door 240 has a curved profile, having a generally U-shaped cross section, to prevent product build up around the conveyor. In endless belt conveyors, product can recycle through the conveyor 5 and tends to accumulate at the lower tail assembly 10. By utilizing a tool-less latch mechanism, the cleanout door 240 can be completely removed. The curved profile of the cleanout door 240 eliminates product accumulation areas without interfering with a cleated belt moving around the first end roller 100. In FIG. 3, the cleanout door 240 is shown mounted to the longitudinal extension bracket 160. The cleanout door 240 can be opened by disengaging the latch mechanism and pulling on handle 245.

Figure 13:
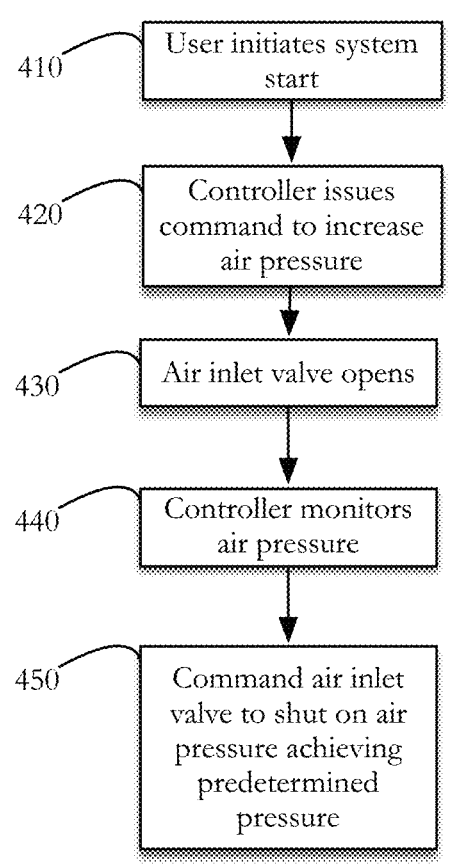
FIG. 13 shows a flow chart of a method for initiating tension on the endless belt using an automated in-line tension control system.

A method for automatically tensioning the conveyor is provided in FIG. 13. First, a user initiates system start, according to step 410. This process may require manual user intervention. Alternatively, the user may initiate the conveyor system as part of a larger seed treatment, grain transportation, bulk weighing, or other type of system. Next, the controller generates a command to increase air pressure, according to step 420. The command may issue as an electronic tensioning signal. An air inlet valve receives the signal and opens to allow the pressurized air to flow through to the air springs, according to step 430. The system may then monitor the air pressure, generating an air pressure signal that corresponds with the air pressure in the automated in-line tensioning system, according to step 440. Once the system detects that air pressure in the automated in-line tensioning system is sufficient, by comparing the air pressure signal with a pre-determined value, then the system generates a command to shut the air inlet valve, according to step 450.

Figure 14:
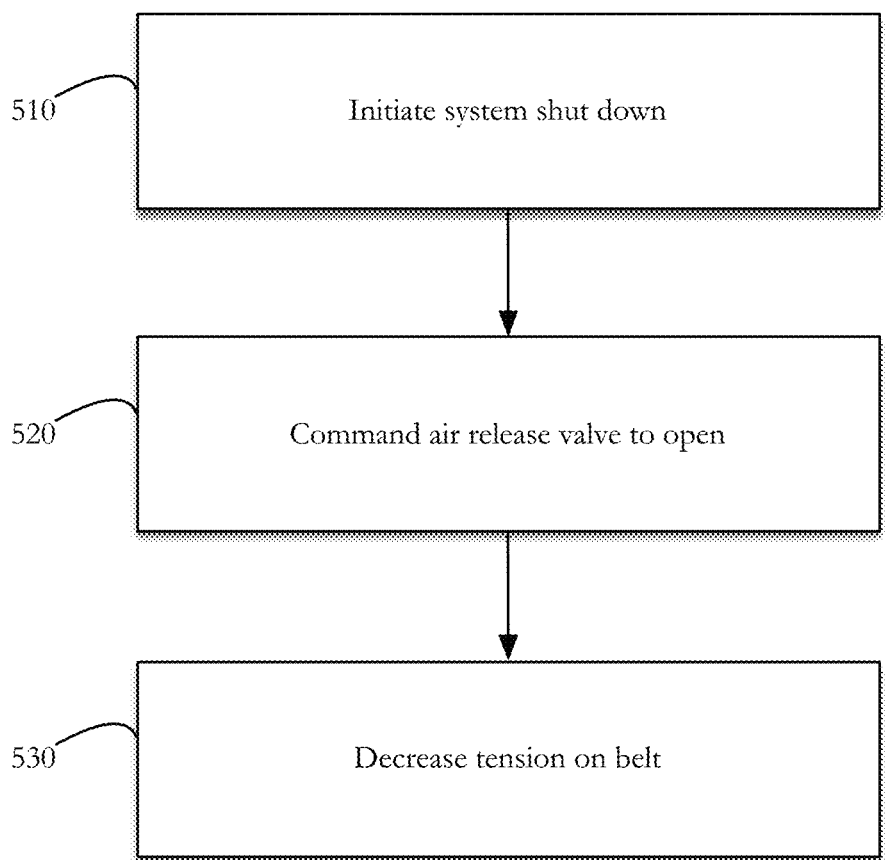
FIG. 14 shows a flow chart of a method for initiating tension release on a conveyor having an endless belt using an automated in-line tension control system.

A method for initiating tension release on a conveyor having an endless belt using an automated in-line tension control system is provided in FIG. 14. When the user initiates a system shut down, according to step 510, this begins the shut down process. This step 510 may require manual user intervention. Alternatively, the user may initiate shut down of the conveyor system as part of a larger seed treatment, grain transportation, bulk weighing, or other type of system. The system generates a command to open the air release valve, according to step 520. The command may issue as an electronic release signal. An air outlet valve receives the signal and opens to allow the pressurized air to release from the air springs, according to step 530. In this way, the system can automatically release the tension on the endless belt. The process may be initiated from a timer, for example if the conveyor has been inactive for a predetermined number of minutes, hours, days, weeks, or months, then the controller will generate a release signal to release belt tension.

Figure 15:
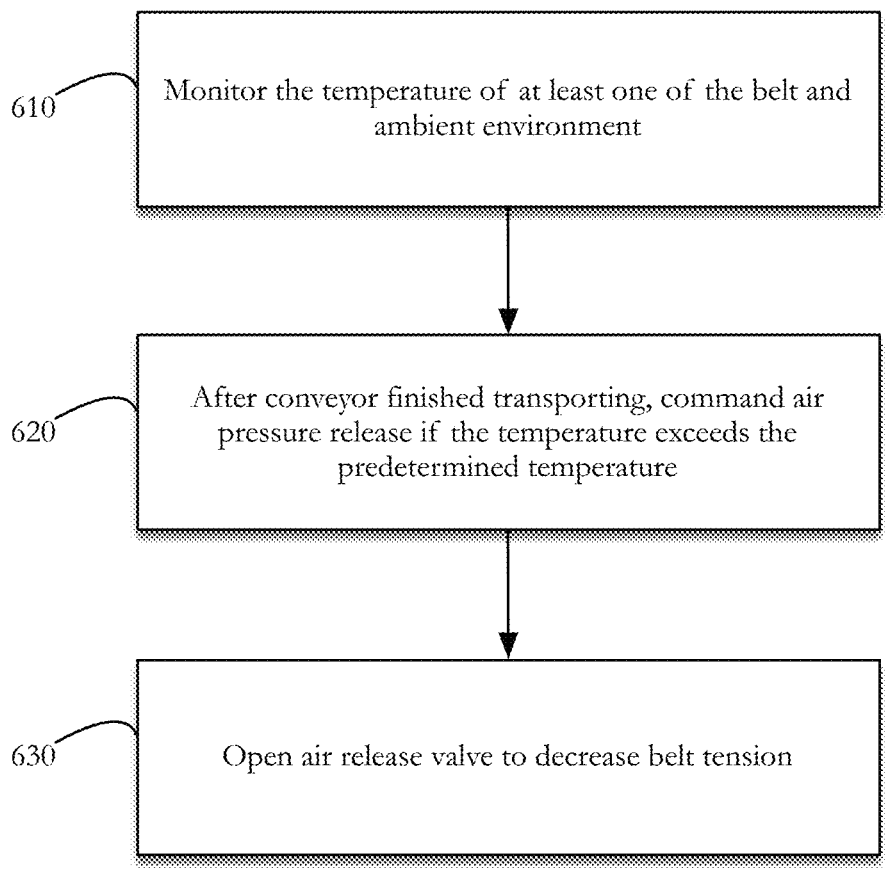
FIG. 15 shows a flow chart of a method for controlling an automated in-line tension control system in response to an environmental condition.

A method for controlling an automated in-line tension control system in response to an environmental condition is shown in FIG. 15. First, the controller monitors the temperature of at least one of the belt and the ambient environment, according to step 610. After the conveyor has finished transporting the granular material, the controller commands the air pressure release if the temperature measured in step 610 exceeds a predetermined temperature. According to step 620. The controller then issues a release signal, which is released by the air outlet valve. The air outlet valve opens to release air pressure within the in-line tension control system to decrease belt tension, according to step 630. In one embodiment, the controller includes a thermometer for measuring the temperature of the ambient conveyor environment or the operating temperature of the belt. If the one or more of the measured temperatures exceeds a predetermined temperature value, the controller can either display a warning thereby prompting the user to reduce belt tension or the controller can automatically shut down the belt and reduce belt tension. This may be especially beneficial to conveyor belts utilizing thermoplastic materials. When the conveyor belt is warm and left in a position around a roller, then the conveyor cools, the belt will tend to keep that shape. Releasing the belt tension for belts that operating in warm or hot conditions may increase belt life.

It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

In the Summary above, the Detailed Description, and in the accompanying drawings, reference is made to particular features including method steps of the invention. The reader should understand that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally. It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

The term "comprises" and its grammatical equivalents are used in this document to mean that other components, steps, etc. are optionally present. For example, an article "comprising" or "which comprises" components A, B, and C can consist of components A, B, and C, or can contain not only components A, B, and C but also one or more other components.

I claim:
1. A conveyor having an end roller and an endless belt for conveying granular material, the conveyor comprising:
  a. a tail assembly having:
    i. a first sidewall;
    ii. a second sidewall;
    iii. a tensioning slot disposed in the first sidewall of the tail assembly;
  b. a tensioner frame securely mounted to the tail assembly, the tensioner frame comprising;
    i. a first plate extending in a generally horizontal plane:
    ii. a first linear bearing mounted upon the first plate:
  c. a tensioner bar slidably received into the tensioning slot and extending horizontally across the tail assembly such that the tensioner bar protrudes through the first sidewall and the second sidewall;
  d. a first air spring disposed between the tensioner frame and the tensioner bar, the first air spring configured to extend in an axis perpendicular to a longitudinal axis of the end roller;

e. a first rail perpendicularly mounted to the tensioner bar and received by the first linear bearing; and f. wherein the tensioner bar is coupled with the end roller such that movement of the tensioner bar moves the end roller to affect a tensioning force upon the endless belt and the first linear bearing is configured to guide movement of the first rail in an axis parallel to the longitudinal axis of the tail assembly.

2. The conveyor of claim 1, further comprising a second air spring mounted between the tensioner frame and the tensioner bar, wherein the second air spring is mounted parallel to the first air spring.

3. The conveyor of claim 2, further comprising an air manifold operably connected to the first air spring and the second air spring.

4. The conveyor of claim 3, wherein each of the first air spring and the second air spring comprises a sleeve-type air bag.

5. The conveyor of claim 1, further comprising an air pressure gauge operably connected to first air spring, wherein the air pressure gauge is configured to display an air pressure value corresponding to the tensioning force of the endless belt.

6. The conveyor of claim 1, further comprising:
a. a tracking assembly slidably received into the tensioning slot; and
b. a linear actuator extending between the tensioner bar and the tracking assembly, wherein the linear actuator is configured to pivot the end roller about a generally vertical axis.

7. The conveyor of claim 1, further comprising:
a. a second rail perpendicularly mounted to the tensioner bar and parallel with the first rail; and
b. a second plate extending in a generally horizontal plane and securely mounted to the first and second rail.

8. The conveyor of claim 7, wherein the first plate and the second plate each comprise a mesh horizontal surface through which debris may pass.

9. A conveyor comprising
a. a conveyor frame;
b. a tensioner bar slidably received within the conveyor frame and extending horizontally across the conveyor frame;
c. a tensioner frame securely mounted to the conveyor frame;
d. an end roller mounted to the tensioner bar;
e. an endless belt partially wrapped around the end roller;
f. a first air spring mounted between the tensioner frame and the tensioner bar, the first air spring configured to extend perpendicular to a longitudinal axis of the tensioner bar thereby exerting a tensioning force on the endless belt;
g. a first rail mounted perpendicular to the tensioner bar;
h. a first linear bearing mounted upon the tensioner frame and configured to receive the first rail and restrict movement of the tensioner bar to movement in an axis perpendicular to the longitudinal axis of the tensioner bar;
i. wherein the first air spring and second air spring is configured to received pressurized air from a pressurized air source; and
j. an air manifold mounted within the conveyor frame, the air manifold operably connected to the first air spring and the second air spring, the air manifold comprising;
i. an inlet valve configured to extend outside of the conveyor frame; and
ii. a plurality of outlet valves each operably connected to a respective air spring.

10. The conveyor of claim 9, further comprising an air pressure gauge operably connected to the first air spring and configured to display an air pressure value corresponding with the tensioning force of the endless belt.

11. The conveyor of claim 9, wherein:
a. the conveyor frame further comprises:
i. a first sidewall;
ii. a second sidewall;
i. wherein the tensioner bar has a peripheral tensioner bar portion protruding through the first sidewall;
c. a tracking assembly disposed between the tensioner bar and the end roller, the tracking assembly comprising:
i. a tracking flange that protrudes through the first sidewall; and
d. a spacing adjustment mechanism configured to selectively adjust a distance between the tensioner bar and the tracking flange, thereby adjusting an angle of the end roller relative to the conveyor frame for proper belt tracking.

12. A conveyor comprising
a. a conveyor frame;
b. an end roller disposed within the conveyor frame;
c. an endless belt partially wrapped around the end roller;
d. a tensioning assembly comprising:
i. a tensioner frame securely mounted to the conveyor frame;
ii. a tensioner bar slidably received into the conveyor frame and coupled with the end roller such that outward movement of the tensioner bar moves the end roller to exert a tensioning force upon the endless belt;
iii. a first air spring disposed between the tensioner frame and the tensioner bar, the first air spring configured to move the tensioner bar outward in an axis perpendicular to the longitudinal axis of the end roller;
iv. an inlet valve operably connected to the first air spring, the inlet valve configured disposed on an exterior surface of the conveyor frame;
e. a controller configured to selectively send a tensioning signal and a release signal; and
f. wherein the inlet valve is configured to direct flow of pressurized air to the first air spring to exert a tensioning force in an axis perpendicular to a longitudinal axis of the end roller upon the end roller upon receiving the tensioning signal; and wherein the inlet valve is configured to release pressurized air from the first air spring to release the tensioning force upon receiving the release signal.

13. The conveyor of claim 12, wherein:
a. an air pressure gauge is operably connected to the first air spring and configured to display an air pressure value corresponding with the tensioning force of the end roller.

14. The conveyor of claim 12, further comprising:
a. a tracking assembly comprising:
i. a tracking flange that protrudes through the conveyor frame; and
ii. a spacing adjustment mechanism configured to selectively adjust the end roller relative to the conveyor frame for proper belt tracking.

15. The conveyor of claim 12 further comprising
a. a temperature sensor for generating a temperature signal corresponding to at least one of the following: ambient temperature and belt operating temperature; and
b. wherein the controller is configured to receive the temperature signal and to generate the release signal when the temperature signal exceeds a predetermined temperature level.

\* \* \* \* \*